(12) United States Patent
Bingham et al.

(10) Patent No.: US 10,011,013 B2
(45) Date of Patent: Jul. 3, 2018

(54) CLOUD-BASED ANALYSIS OF ROBOTIC SYSTEM COMPONENT USAGE

(71) Applicant: X Development LLC, Mountain View, CA (US)

(72) Inventors: Jeffrey Thomas Bingham, San Francisco, CA (US); Robert Wilson, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 364 days.

(21) Appl. No.: 14/672,706

(22) Filed: Mar. 30, 2015

(65) Prior Publication Data

US 2016/0288328 A1   Oct. 6, 2016

(51) Int. Cl.
  *B25J 9/16* (2006.01)
  *G06Q 10/00* (2012.01)
(52) U.S. Cl.
  CPC ............ *B25J 9/1674* (2013.01); *G06Q 10/20* (2013.01)
(58) Field of Classification Search
  None
  See application file for complete search history.

(56) References Cited

U.S. PATENT DOCUMENTS

| | | | |
|---|---|---|---|
| 7,600,593 B2 | 10/2009 | Filippov | |
| 8,185,346 B2 | 5/2012 | Sjostrand et al. | |
| 8,671,315 B2 | 3/2014 | MacKey et al. | |
| 8,732,260 B2 | 5/2014 | Lewis | |
| 8,930,022 B1 | 1/2015 | Kuffner | |
| 9,024,771 B1 | 5/2015 | Kuffner | |

(Continued)

FOREIGN PATENT DOCUMENTS

| | | |
|---|---|---|
| EP | 2801935 A1 | 11/2014 |
| EP | 2801938 A1 | 11/2014 |

OTHER PUBLICATIONS

Lee, Jay, Jun Ni, Dragan Djurdjanovic, Hai Qiu, and Haitao Liao. "Intelligent Prognostics Tools and E-maintenance." Computers in Industry 57.6 (2006): 476-89.*

(Continued)

*Primary Examiner* — Joseph Schoenholtz
(74) *Attorney, Agent, or Firm* — McDonnell Boehnen Hulbert & Berghoff LLP

(57) ABSTRACT

Example implementations may relate to a cloud service that stores a detection metric corresponding to a maintenance request for a particular component. In particular, the cloud may receive sensor data from various robotic systems each having the particular component. The cloud may then determine, based on the sensor data, performance data for the particular component over time at the various robotic systems. The cloud may also determine various maintenance events for the particular component. Based on the performance data, the cloud may determine that at least one maintenance event occurs at other metrics that are different from the detection metric. Responsively, the cloud may adjust the detection metric based on a difference between the detection metric and the other metrics. The cloud may then detect operation of a particular robotic system at the adjusted detection metric and may responsively request maintenance for the particular component at the particular robotic system.

12 Claims, 6 Drawing Sheets

(56) References Cited

U.S. PATENT DOCUMENTS

| | | | | |
|---|---|---|---|---|
| 9,205,560 | B1* | 12/2015 | Edsinger | B25J 9/1674 |
| 9,447,849 | B1* | 9/2016 | Edsinger | F16H 7/02 |
| 9,457,985 | B1* | 10/2016 | Gallagher | B65H 59/04 |
| 9,471,904 | B2 | 10/2016 | Kuffner | |
| 9,505,132 | B1* | 11/2016 | Bingham | B25J 9/1692 |
| 2005/0206339 | A1 | 9/2005 | Yoshida | |
| 2007/0147976 | A1* | 6/2007 | Rice | G03F 7/70991 |
| | | | | 414/217 |
| 2010/0138038 | A1* | 6/2010 | Moon | B25J 13/085 |
| | | | | 700/245 |
| 2010/0305758 | A1 | 12/2010 | Nishi | |
| 2011/0046775 | A1 | 2/2011 | Bailey | |
| 2011/0054680 | A1 | 3/2011 | Nakata | |
| 2011/0313568 | A1* | 12/2011 | Blackwell | B25J 5/007 |
| | | | | 700/245 |
| 2012/0010748 | A1* | 1/2012 | Sasai | B25J 9/1674 |
| | | | | 700/254 |
| 2012/0048027 | A1 | 3/2012 | Hashiguchi | |
| 2012/0165780 | A1* | 6/2012 | Bazargan | A61M 5/00 |
| | | | | 604/500 |
| 2013/0275059 | A1 | 10/2013 | Bernhard et al. | |
| 2014/0067124 | A1* | 3/2014 | Williamson | G05B 19/406 |
| | | | | 700/258 |
| 2014/0201571 | A1* | 7/2014 | Hosek | G06F 11/2257 |
| | | | | 714/26 |
| 2014/0336791 | A1* | 11/2014 | Asenjo | G06Q 10/06 |
| | | | | 700/44 |
| 2014/0337000 | A1* | 11/2014 | Asenjo | G06Q 10/06 |
| | | | | 703/13 |
| 2014/0358453 | A1 | 12/2014 | Kirk | |
| 2015/0227838 | A1* | 8/2015 | Wang | G06F 11/008 |
| | | | | 706/12 |
| 2017/0011360 | A1 | 1/2017 | Kuffner | |
| 2017/0357953 | A1 | 12/2017 | Kuffner | |

OTHER PUBLICATIONS

A. Yamada, S. Takata, Reliability Improvement of Industrial Robots by Optimizing Operation Plans Based on Deterioration Evaluation, CIRP Annals—Manufacturing Technology, vol. 51, Issue 1, 2002, pp. 319-322.*

Stancliff, S., et. al., "Towards a Predictive Model of Robot Reliability", CMU-RI-TR-05-38, Robotics Institute, Carneige Mellon University, Aug. 2005.*

Liu, G. "Control of Robot Manipulators with Consideration of Actuator Performance Degradation and Failures." Proceedings 2001 ICRA. IEEE International Conference on Robotics and Automation (Cat. No. 01CH37164).*

International Search Report for corresponding PCT application No. PCT/US2016/021186 dated May 24,2016.

Arumugan, Rajesh et al, DAvinCi: A Cloud Computing Framework for Service Robots, 2010 IEEE Conference on Robotics and Automation, Anchorage Convention District, Anchorage, Alaska, May 3-8, 2010.

Park, Juyi et al, Toward Intelligent System Health Monitoring for NASA Robonaut, 4th IEEE/RAS International Conference on Humanoid Robotics, 2004.

* cited by examiner

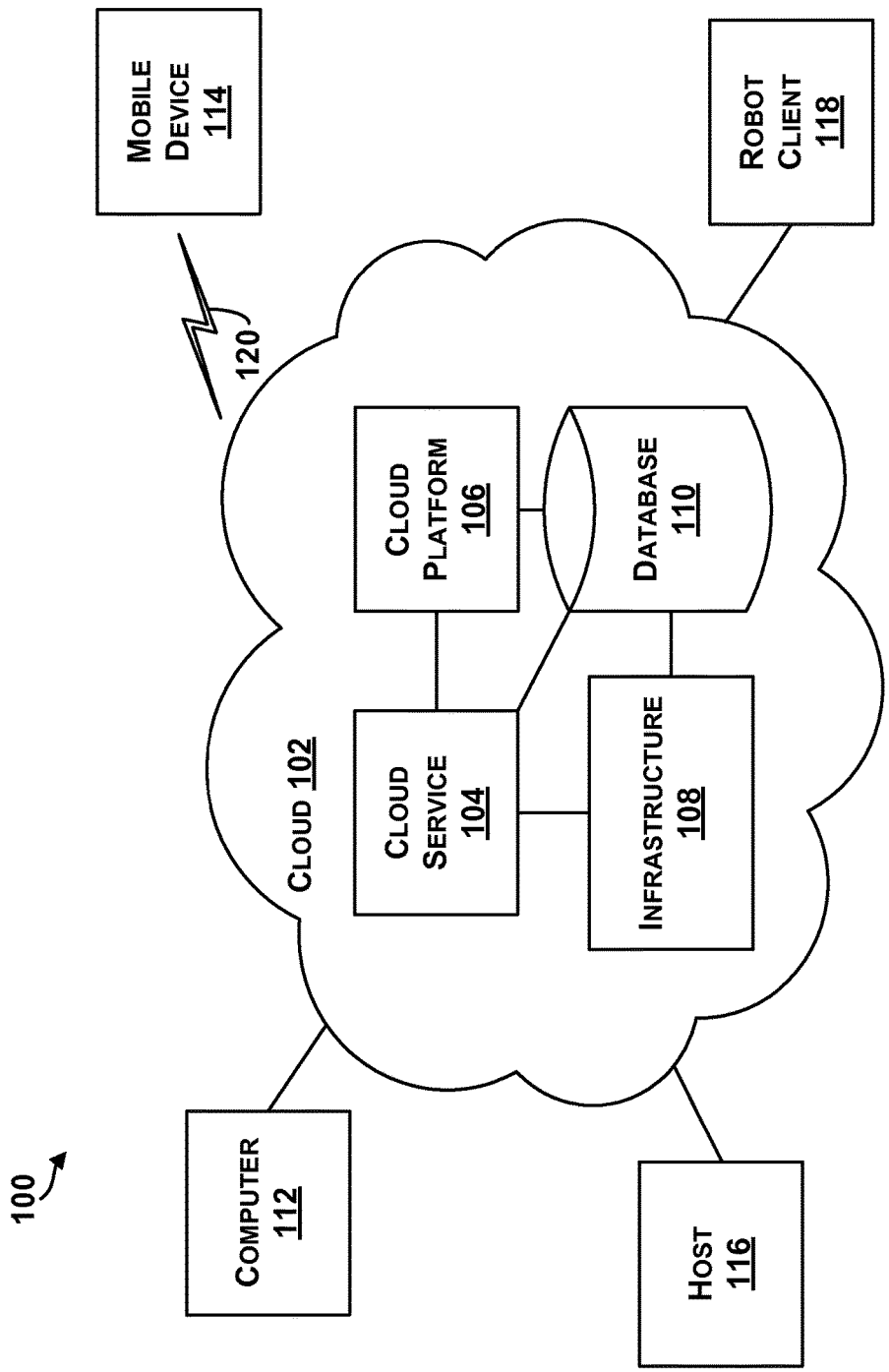

CLOUD-BASED ANALYSIS OF ROBOTIC SYSTEM COMPONENT USAGE

BACKGROUND

Cloud computing refers to a provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software for collecting commands from the user and interpreting the commands into commands on the servers. The servers may handle the computing, and can either store or retrieve information from database servers or file servers and display an updated page to the user. Through "cloud computing", data across multiple servers can be synchronized around the world allowing for collaborative work on one file or project by multiple users around the world, for example.

SUMMARY

Example implementations may relate to cloud-based analysis of robotic system component usage. In particular, a cloud service can store a detection metric that triggers a maintenance request for a particular component in a robotic system. This cloud service may receive sensor data from various robotic systems each having the particular component and the cloud may then determine, based on the sensor data, performance data for the particular component over time at the various robotic systems. Further, the cloud may also determine various maintenance events for the particular component, such as based on input indicating that maintenance has taken place for the particular component.

Based on the performance data, the cloud may then determine that at least one maintenance event occurs due to robotic system operation at other metrics that are different from the stored detection metric. Responsively, the cloud may determine a difference between the detection metric and the other metrics and may then adjust the detection metric based on this difference. With this arrangement, the cloud may then detect operation of a particular robotic system at the adjusted detection metric and can responsively request maintenance for the particular component at the particular robotic system.

In one aspect, a method is provided. The method involves receiving, by a computing system, sensor data from a plurality of robotic systems each having one or more sensors and a particular component, where the computing system has stored thereon at least one detection metric that corresponds to a maintenance request for the particular component. The method also involves determining, based on the sensor data, performance data representing performance of the particular component over time at the plurality of robotic systems. The method additionally involves determining a plurality of maintenance events for the particular component, where the plurality of maintenance events are associated with one or more of the plurality of robotic systems. The method further involves, based on the performance data, making a determination that at least one of the plurality of maintenance events occurs at one or more other metrics that are different from the at least one detection metric. The method yet further involves, in response to making the determination, adjusting the at least one detection metric based on a difference between the at least one detection metric and the one or more other metrics. The method yet further involves detecting subsequent operation, of a particular robotic system from among the plurality of robotic systems, corresponding to the at least one adjusted detection metric and responsively requesting maintenance for the particular component at the particular robotic system.

In another aspect, a non-transitory computer readable medium is provided. The non-transitory computer readable medium has stored therein instructions executable by one or more processors to cause a computing system to perform functions. The functions include receiving sensor data from a plurality of robotic systems each having one or more sensors and a particular component, where the computing system has stored thereon at least one detection metric that corresponds to a maintenance request for the particular component. The functions also include determining, based on the sensor data, performance data representing performance of the particular component over time at the plurality of robotic systems. The functions additionally include determining a plurality of maintenance events for the particular component, where the plurality of maintenance events are associated with one or more of the plurality of robotic systems. The functions further include, based on the performance data, making a determination that at least one of the plurality of maintenance events occurs at one or more other metrics that are different from the at least one detection metric. The functions yet further include, in response to making the determination, adjusting the at least one detection metric based on a difference between the at least one detection metric and the one or more other metrics. The functions yet further include detecting subsequent operation, of a particular robotic system from among the plurality of robotic systems, corresponding to the at least one adjusted detection metric and responsively requesting maintenance for the particular component at the particular robotic system.

In yet another aspect, a computing system is provided. The computing system includes a non-transitory computer readable medium. The computing system also includes program instructions stored on the non-transitory computer readable medium and executable by at least one processor to receive sensor data from a plurality of robotic systems each having one or more sensors and a particular component, where the computing system has stored thereon at least one detection metric that corresponds to a maintenance request for the particular component. The instructions are also executable to determine, based on the sensor data, performance data representing performance of the particular component over time at the plurality of robotic systems. The instructions are additionally executable to determine a plurality of maintenance events for the particular component, where the plurality of maintenance events are associated with one or more of the plurality of robotic systems. The instructions are further executable to, based on the performance data, make a determination that at least one of the plurality of maintenance events occurs at one or more other metrics that are different from the at least one detection metric. The instructions are yet further executable to, in response to making the determination, adjust the at least one detection metric based on a difference between the at least one detection metric and the one or more other metrics. The instructions are yet further executable to detect subsequent operation, of a particular robotic system from among the plurality of robotic systems, corresponding to the at least one adjusted detection metric and responsively request maintenance for the particular component at the particular robotic system.

In yet a further aspect, another system is provided. The system may include means for receiving sensor data from a plurality of robotic systems each having one or more sensors and a particular component, where the system has stored thereon at least one detection metric that corresponds to a maintenance request for the particular component. The system may also include means for determining, based on the sensor data, performance data representing performance of the particular component over time at the plurality of robotic systems. The system may additionally include means for determining a plurality of maintenance events for the particular component, where the plurality of maintenance events are associated with one or more of the plurality of robotic systems. The system may further include means for, based on the performance data, making a determination that at least one of the plurality of maintenance events occurs at one or more other metrics that are different from the at least one detection metric. The system may yet further include means for, in response to making the determination, adjusting the at least one detection metric based on a difference between the at least one detection metric and the one or more other metrics. The system may yet further include means for detecting subsequent operation, of a particular robotic system from among the plurality of robotic systems, corresponding to the at least one adjusted detection metric and responsively requesting maintenance for the particular component at the particular robotic system.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 1 illustrates an example system for cloud-based computing, according to an example implementation.

DETAILED DESCRIPTION

Figure 2A:
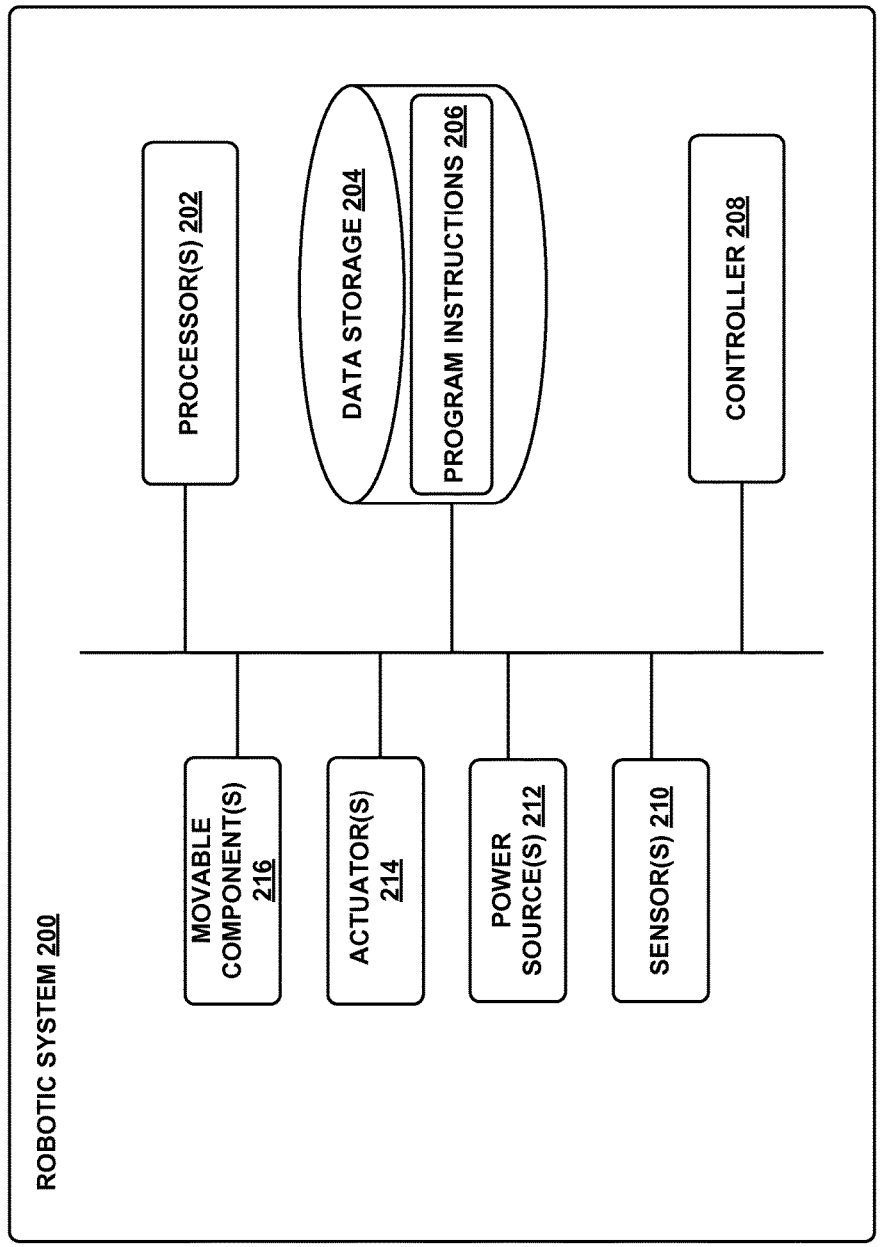
FIG. 2A illustrates an example configuration of a robotic system, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

According to various implementations, described herein are methods and systems for cloud-based analysis of robotic system component usage. Within examples, cloud-based computing generally refers to networked computer architectures in which application execution and storage may be divided, to some extent, between client and server devices. Moreover, a robotic system may be any device that has a computing ability and interacts with its surroundings with an actuation capability (e.g., electromechanical capabilities). Accordingly, various robotic systems may interact with the cloud to perform any number of actions, such as to share information with other cloud computing devices, to share sensor data with the cloud, and/or to receive information from the cloud.

In examples described herein, the cloud may process and store received sensor data in order to determine and evaluate performance of various components in the robotic systems over time. This performance data can be accessible to users of the robotic systems, such as via computing devices in communication with the cloud. In this manner, the system can provide for models representing the state of the robotic systems over time.

With this arrangement, the cloud could analyze and monitor performance of a particular component that is present across various robotic systems. For instance, several robotic system in communication with the cloud may include a particular actuator (e.g., of a particular manufacturer and/or of a particular model). In this instance, the cloud can use sensor data to determine performance of this actuator over time, such as by monitoring operational parameters including applied torque and/or power consumption, among others.

Further, the cloud may store a detection metric that corresponds to detecting operation of a particular robotic system at a metric that could lead to potential wear or failure of the particular component. For instance, the cloud can determine that the actuator is operating (or has operated) in a particular robotic system by applying a particular torque that corresponds to potential failure of the actuator in the particular robotic system. When the cloud encounters such a detection metric, the cloud may send out a maintenance request requesting maintenance for this particular component at the particular robotic system. This maintenance request may be sent to a computing device associated with the particular robotic system and the request may specify for replacement of the component or for particular adjustments to the component, among other possibilities.

As the cloud gathers performance data over time related to performance of the particular component at the various robotic systems, the cloud may determine trends in the data that could lead to adjustments of the detection metric. In particular, the cloud can maintain a record of maintenance events that provide for information related to maintenance that has taken place for the particular component. This record may include details of the maintenance that has taken place as well as a time of the maintenance, among others.

With this arrangement, the cloud can determine that some maintenance events occur at other metrics that are different from the detection metric. For instance, the cloud may determine that the actuator generally tends to fail when applying another torque that is lower than the particular torque associated with the detection metric noted above. Upon this detection, the cloud may evaluate the difference between these other metrics and the detection metric. Based on this evaluation, the cloud may then adjust the detection metric such that when the cloud determines operation of a particular robotic system at the adjusted detection metric, the cloud may request maintenance for the particular component at this particular robotic system. In this manner, the cloud may provide for models representing a state of robotic systems as well as for early identification and prediction of component wear and failure.

II. EXAMPLE ARCHITECTURE FOR ROBOT-CLOUD INTERACTION

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud-based application. In addition, dividing application execution and storage between the client and server devices allows more processing to be performed by the server devices, thereby taking advantage of the server devices' processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more or fewer components, and each of the cloud service 104, the cloud platform 106, the cloud infrastructure 108, and the database 110 may comprise multiple elements as well. Thus, one or more of the described functions of the system 100 may be divided into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.). Also, the host 116 may be any type of computing device with a transmitter/receiver including a laptop computer, a mobile telephone, etc., that is configured to transmit/receive data to/from the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118 (and/or to a computing device that is associated with the robot client 118). In some examples, as shown in FIG. 1, the cloud 102 may include a computer that is not co-located with the robot client 118. In other examples, the robot client 118 may send data to a second client (e.g., computer 112) for processing.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

FIG. 2A shows an example configuration of a robot client, such as robotic system 200. The robotic system 200 may be a robotic arm, a humanoid robot, or a quadrupedal robot, among other examples. Additionally, the robotic system 200 may also be referred to as a robotic device, robotic manipulator, or robot, among others.

The robotic system 200 is shown to include processor(s) 202, data storage 204, program instructions 206, controller 208, sensor(s) 210, power source(s) 212, actuator(s) 214, and movable component(s) 216. Note that the robotic system 200 is shown for illustration purposes only and robotic system 200 may include additional components and/or have one or more components removed without departing from the scope of the disclosure. Further, note that the various components of robotic system 200 may be connected in any manner.

Processor(s) 202 may be a general-purpose processor or a special purpose processor (e.g., digital signal processors, application specific integrated circuits, etc.). The processor(s) 202 can be configured to execute computer-readable program instructions 206 that are stored in the data storage 204 and are executable to provide functionality of the robotic system 200. For instance, the program instructions 206 may be executable to provide functionality of controller 208, where the controller 208 may be configured to instruct an actuator 214 to cause movement of one or more movable component(s) 216.

The data storage 204 may include or take the form of one or more computer-readable storage media that can be read or accessed by processor(s) 202. The one or more computer-readable storage media can include volatile and/or non-volatile storage components, such as optical, magnetic, organic or other memory or disc storage, which can be integrated in whole or in part with processor(s) 202. In some implementations, the data storage 204 can be implemented using a single physical device (e.g., one optical, magnetic, organic or other memory or disc storage unit), while in other implementations, the data storage 204 can be implemented using two or more physical devices. Further, in addition to the computer-readable program instructions 206, the data storage 204 may include additional data such as diagnostic data, among other possibilities.

The robotic system 200 may include one or more sensor(s) 210 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, structured-light, and/or a time-of-flight camera), motion sensors (e.g., gyroscope, accelerometer, inertial measurement unit (IMU), and/or foot step or wheel odometry), and/or range sensors (e.g., ultrasonic and/or infrared), among others. The sensor(s) 210 may provide sensor data to the processor(s) 202 to allow for appropriate interaction of the robotic system 200 with the environment. Additionally, the robotic system 200 may also include one or more power source(s) 212 configured to supply power to various components of the robotic system 200. Any type of power source may be used such as, for example, a gasoline engine or a battery.

The robotic system 200 may also include one or more actuator(s) 214. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in robotic system 200). In other cases, an actuator may be a linear actuator that may be used in systems involving straight line motion. In either case, actuator(s) 214 may cause movement of various movable component(s) 216 of the robotic system 200. The moveable component(s) 216 may include appendages such as robotic arms, legs, and/or hands, among others. The moveable component(s) 216 may also include a movable base, wheels, and/or end effectors, among others.

In addition, the robotic system 200 may also have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In a further aspect, a computing device (not shown) may be coupled to the robotic system 200 and may be configured to receive input from a user, such as via a graphical user interface. This computing device may be incorporated within the robotic system 200 or may be an external computing device that is capable of (wired or wireless) communication with the robotic system 200. As such, the robotic system 200 may receive information and instructions, such as based on user-input at the graphical user interface and/or based on user-input received via press of buttons (or tactile input) on the robotic system 200, among other possibilities. Note that such a computing device may also interact with the cloud (e.g., computer 112).

In some examples, various sensors and devices on the robotic system 200 may be modules. Different modules may be added or removed from the robotic system 200 depending on requirements. For example, in a low power situation, the robotic system 200 may have fewer modules to reduce power usages. However, additional sensors may be added as needed. To increase an amount of data the robotic system 200 may be able to collect, additional sensors may be added, for example.

Further, the robotic system 200 may be configured to receive a device that includes the processor 202, the data storage 204, and the sensors 210. For example, the robotic system 200 may have a number of mechanical actuators (e.g., a movable base), and the robotic system 200 may be configured to receive a mobile telephone, smartphone, tablet computer, etc. to function as the "brains" or control components of the robot. This device may be considered a module of the robotic system 200. Additionally, the device may be physically attached to the robotic system 200. For example, a smartphone may sit on a robot's "chest" and form an interactive display. The device may provide the robotic system 200 with sensors, a wireless link, and processing capabilities, for example. The device may also allow a user to download new routines for his or her robot from the cloud. For example, a laundry folding routine may be stored on the cloud, and a user may be able to select this routine using a smartphone to download the routine from the cloud, and when the smartphone is placed into or coupled to the robot, the robot would be able to perform the downloaded action.

In other examples, the robotic system 200 may be coupled to a mobile or cellular telephone to provide additional sensing capabilities. The cellular phone may not be physically attached to the robotic system 200, but may be coupled to the robotic system 200 wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the robotic system 200 may include mechanical robot features, and may be configured to receive the device (e.g., a mobile phone, smartphone, tablet computer, etc.), which can provide additional peripheral components to the robotic system 200, such as any of an accelerometer, gyroscope, compass, GPS, camera, WiFi connection, a touch screen, etc., that are included within the robotic system 200.

Yet further, robotic system 200 may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, ARCOS (advanced robotics control operating system), or proprietary software. A robot operating system may include functionality to control components of a robot, such as head tracking, base movement (e.g., velocity control, navigation framework), etc.

Figure 2B:
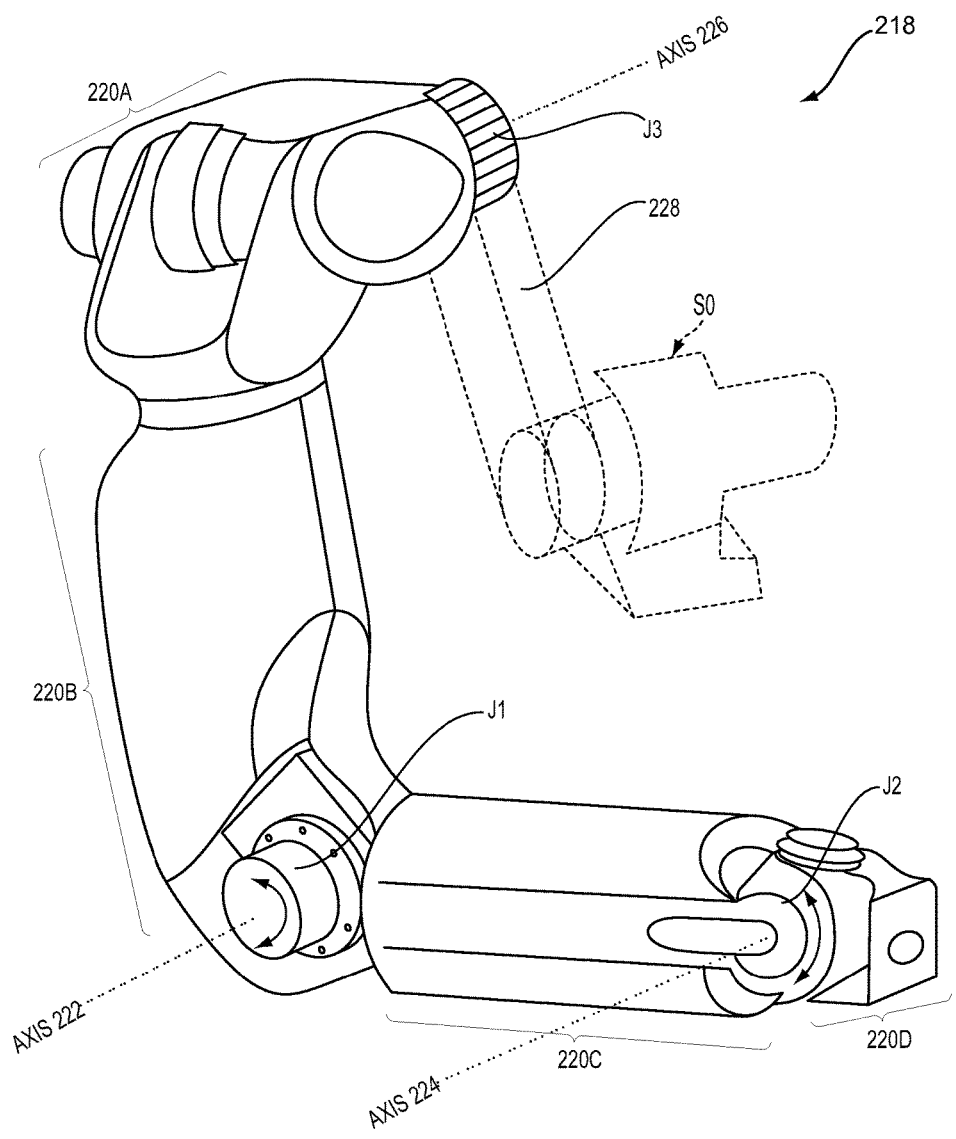
FIG. 2B illustrates a graphical example of a robotic arm, according to an example implementation.

A robotic system 200 may take on various forms. To illustrate, refer to FIG. 2B showing an example robotic arm 218. As shown, the robotic arm 218 includes movable component(s) 216 such as appendages 220A-220D, among others. Additionally, the robotic arm 218 includes joints J1-J3, each coupled to one or more actuators (e.g., actuator S0). The actuators in joints J1-J3 may operate to cause movement of various movable component(s) 216 such as appendages 220A-220D. For example, the actuator in joint J1 may cause movement of appendage 220C about axis 222 (e.g., resulting in rotation about a central axis of joint J1). Whereas, the actuator in joint J2 may cause movement of appendage 220D about axis 224 (e.g., resulting in rotation of joint J2). Other examples may also be possible.

In a specific example, robotic arm 218 is shown to include an actuator S0 (e.g., positioned inside a chest of a humanoid robot) that may take the form of the actuator 214 discussed above. Actuator S0 may be configured to apply a rotational force at joint J3 and, as a result, may cause a rotation of appendage 220A about axis 226. Such a rotation of appendage 220A may result in a collective movement of the entire robotic arm 218. In particular, FIG. 2B shows a form of belt-driven actuation where a timing belt 228 may be tightly wrapped around a portion of the transmission of the actuator S0 and a portion of a rotary mechanism (not shown) that is coupled to joint J3. More specifically, the rotary mechanism may be coupled to the appendage 220A such that the actuator S0 can cause a rotation of the rotary mechanism via the timing belt 228, thereby causing a rotation of the appendage 220A about axis 226.

The timing belt 228 may be used for one of various reasons. For instance, the timing belt 228 may be used as an alternative to direct actuation in order to enable designs that place the actuator S0 further from the mechanism to which the actuator S0 provides actuation. Additionally, the timing belt 228 may take on one of various forms. For instance, the timing belt 228 may be composed of any material (e.g., rubber) and may include teeth on an inside surface of the timing belt 228. The teeth may interact with gears of the transmission in the actuator S0 such that the gears can cause mechanical movement of the timing belt 228. The teeth may also interact with the rotary mechanism such that the mechanical movement of the timing belt 228 results in the rotation of the appendage 220A about axis 226. In some cases, the timing belt 228 could be coupled to a tensioner (not shown) that applies a force to the timing belt 228 in order to create or maintain particular tension of the timing belt. The tensioner (or a tension sensor) could also provide a measure of tension of the timing belt 228 to a computing system (e.g., to the cloud). Other examples are also possible.

Figure 3:
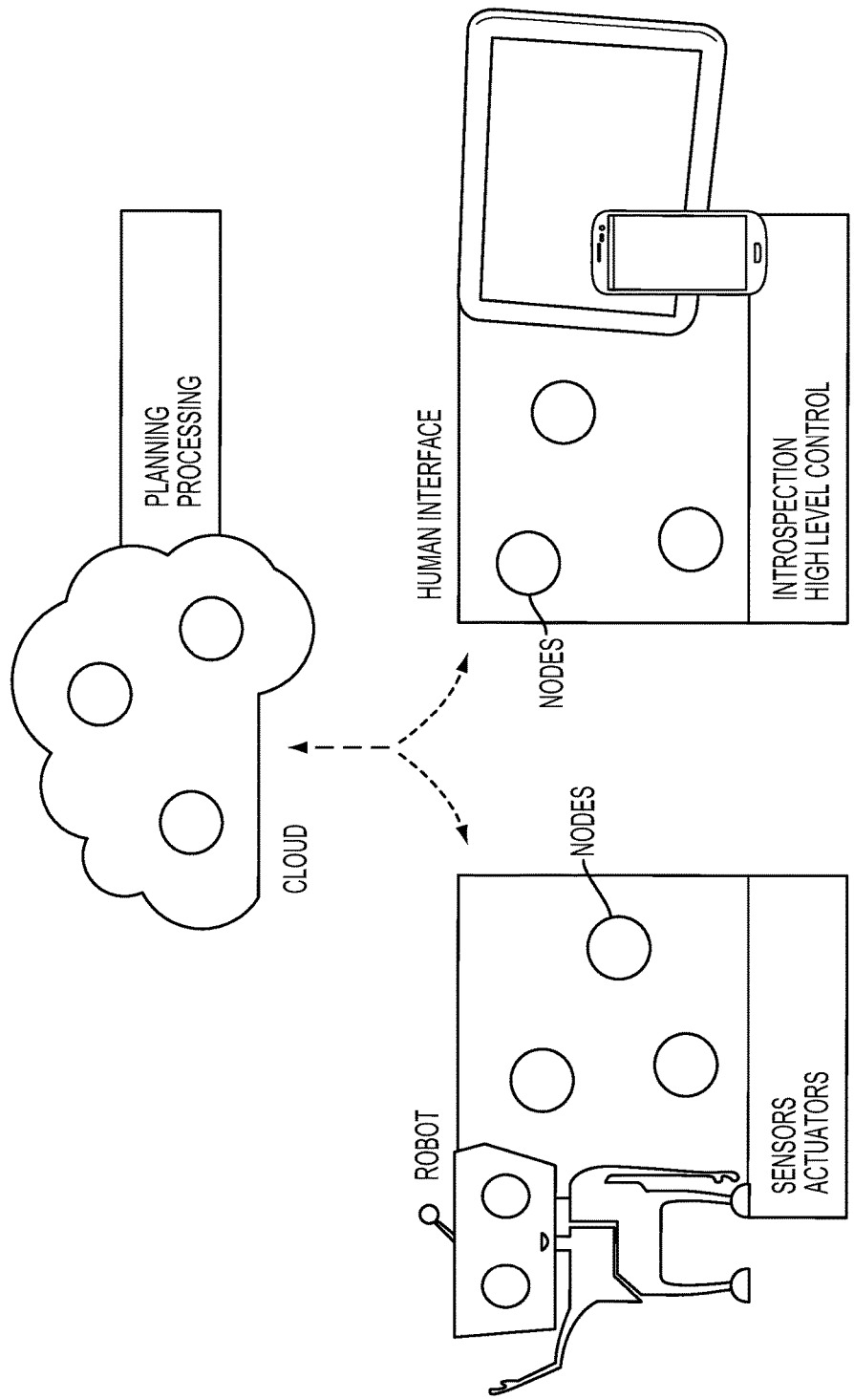
FIG. 3 illustrates example of a conceptual robot-cloud interaction, according to an example implementation.

FIG. 3 next illustrates an example of a conceptual robot-cloud interaction. A robot, such as the robots described and illustrated in FIGS. 2A-2B, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions.

The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing. As shown, any of the modules may be interconnected, and/or may communicate to receive data or instructions from each other so as to provide a specific output or functionality for the robot.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the Internet.

Figure 4:
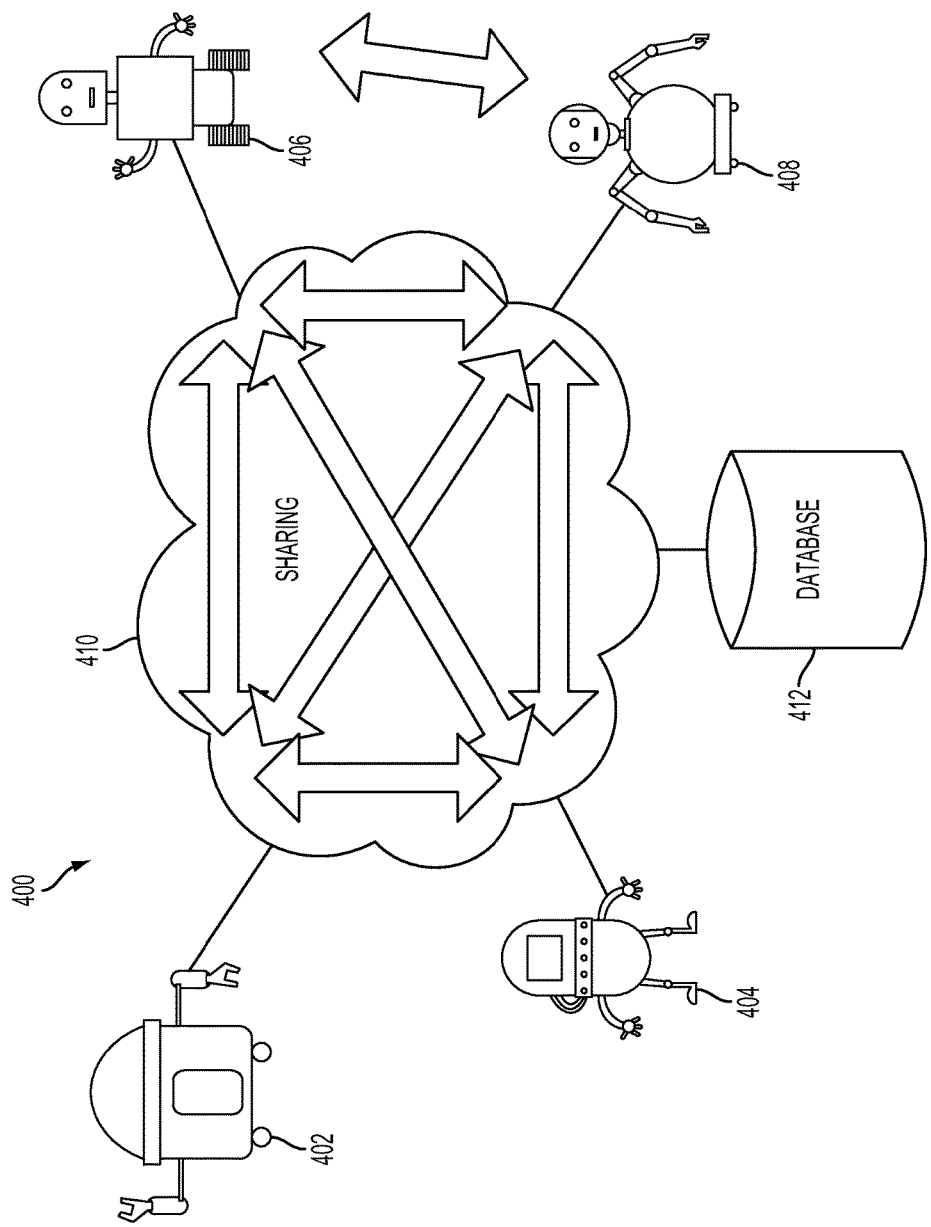
FIG. 4 illustrates an example system in which robots may interact with the cloud and share information with other cloud computing devices, according to an example implementation.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program on the cloud 410 may be configured to identify the object in the picture and provide data about the recognized object to all the robots connected to the cloud 410, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions within an area, with people, with other robots, etc. In one example, each robot 402, 404, 406 and 408 has WiFi or another network based connectivity and will upload/publish data to the cloud 410 that can then be shared with any other robot. In this manner, each robot 402, 404, 406 and 408 shares experiences with each other to enable learned behaviors. For example, the robot 402 may traverse a pathway and encounter an obstacle, and can inform the other robots 404, 406, and 408 (through the cloud 410) of a location of the obstacle. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, mapping of a physical location, such as providing data regarding a history of where a robot has been, can be provided. Another number or type of indicators may be recorded to facilitate mapping/navigational functionality of the robots 402, 404, 406, and 408 (e.g., a scuff mark on a wall can be one of many cues that a robot may record and then rely upon later to orient itself).

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410. Thus, in some examples, robots may share learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and build a map of an area, and then the robot can upload the data to the cloud 410 to share this knowledge with all other robots. In this example, a transportation of the given robot's "consciousness" can be made through the cloud 410 from one robot to another (e.g., robot "Bob" builds a map, and the knowledge of "Bob" can be downloaded onto another robot to receive knowledge of the map). Thus, within examples, the robots 402, 404, 406, and 408 may share information through the cloud 410, and may access the database 412.

III. ILLUSTRATIVE METHODS

Figure 5:
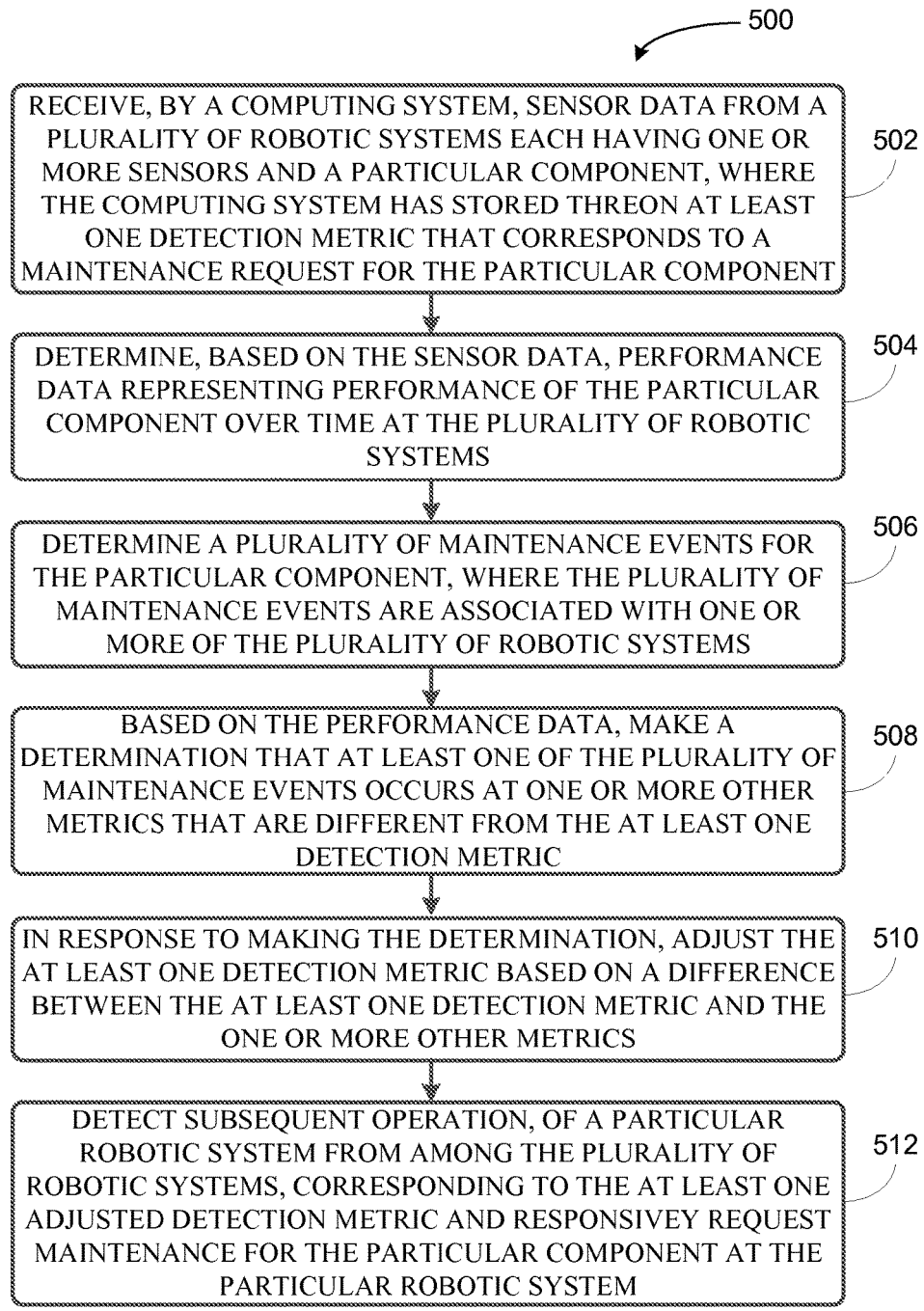
FIG. 5 is a flowchart illustrating a method for cloud-based analysis of robotic system component usage, according to an example implementation.

FIG. 5 shows an example method for cloud-based analysis of robotic system component usage. In particular, FIG. 5 is a flowchart illustrating a method 500, according to an example implementation. Illustrative methods, such as method 500, may be carried out in whole or in part by a component or components in a computing system, such as by the one or more of the components of the cloud 102 shown in FIG. 1. However, it should be understood that example methods, such as method 500, may be carried out by other entities or combinations of entities (i.e., by other computing devices and/or combinations of computing devices), without departing from the scope of the disclosure.

As shown by block 502, method 500 involves receiving, by a computing system (e.g., cloud 102), sensor data from a plurality of robotic systems each having one or more sensors and a particular component, where the computing system has stored thereon at least one detection metric that corresponds to a maintenance request for the particular component. And as shown by block 504, method 500 then involves determining, based on the sensor data, performance data representing performance of the particular component over time at the plurality of robotic systems.

In an example arrangement, a plurality of robotic systems may each include a particular component. For instance, the particular component may be a particular timing belt (e.g., timing belt 228) that is installed within all these robotic systems. The installed timing belts may all take the same or similar form, such as being of the same manufacturer and/or model for instance. Moreover, the plurality of robotic systems may all take on the same or similar configuration. Alternatively, the plurality of robotic systems could take on different configurations while each robotic system still includes the particular timing belt.

Additionally, the plurality of robotic systems may each include various sensors such as any of the sensor(s) 210 noted above. In particular, one or more such sensors at a particular robotic system could provide sensor data related to operation of the particular component at the particular robotic system. For example, as noted above, a tensioner (or a tension sensor) could provide a measure of tension of the timing belt. In another example, the particular component may be an actuator and a torque sensor could provide a measure of torque applied by the actuator. Other examples are also possible.

In an example implementation, a robotic system may acquire data from the sensors and the acquired data may be processed by an on-board CPU (e.g., processor 202) to refine the data and subsequently aggregate and compress (e.g., using delta compression) the data into an arrangement used for a query (e.g., a data packet) sent to the cloud. Once received, an interpretation of the data packet could be distributed among one or more processors associated with the cloud. The one or more processors may then work in parallel to interpret the data detected by the sensors and responsively send the results to a central server. Moreover, the cloud may store the sensor data and/or the interpretation of the sensor data (e.g., in database 110).

In addition to the data obtained from the sensors, the query may also include other information such as robot-specific data and/or component-specific data. For instance, this information may include: model of the particular robotic system, configuration of the particular robotic system, identifier of the particular robotic system, category of the particular component, model of the particular component, and/or position of the particular component in the particular robotic system, among others. Further, the query may include a time that the data packet is sent and the cloud may store the corresponding time. Additionally or alternatively, the cloud may determine a time that the data pocket is received and may store the corresponding time.

With this arrangement, the cloud can receive sensor data from the plurality of robotic systems and could use the data to determine performance of a particular component that is present across the plurality of robotic systems. For instance, the cloud could obtain and store sensor data representing tension of the particular timing belt over time at each of the plurality of robotic systems. Moreover, the cloud could categorize the data based on the particular component associated with the data.

In this manner, the data could be accessible to a user such as via a user interface of a computing device that is in communication with the cloud. In particular, this arrangement can provide for models representing a state of one or more of the robotic systems and/or of the particular component. For example, user-input may be received at the computing device requesting information regarding the particular component. Responsively, the computing device could display (e.g., based on information obtained from the cloud) performance data representing performance of the particular component over time at each of the plurality of robotic systems (e.g., in the form of a graph). In one example, the computing device could display a measure of tension of the timing belt over time at each of the plurality of robotic systems (or at a particular robotic system). In another example, the computing device could display a measure for average tension of the particular timing belt over time at the plurality of robotic systems. Other examples are also possible.

As noted above, the cloud may have stored thereon (e.g., on database 110) a detection metric that corresponds to a maintenance request for the particular component. Such maintenance could take the form of replacement of the particular component or a particular adjustment to the particular component, among other possibilities. In particular, the cloud could analyze the performance data and determine a trigger within the performance data indicating that maintenance should be performed on the particular component at a particular robotic system. Responsively, the cloud could send a maintenance request to a computing device that is associated with the particular robotic system. Moreover, the detection metric could take on various forms as further discussed below.

In one case, the detection metric may correspond to detecting a failure of the particular component. In particular, the cloud may detect a value (or a combination of values) in the performance data that corresponds to failure of the particular component. By way of example, refer again to FIG. 2B showing the actuator S0 and timing belt 228. In this example, the cloud may receive data related to the torque applied by the actuator S0 (e.g., from a torque sensor) and may also receive data related to rotation/motion of the joint J3 (e.g., from a motion sensor). With this arrangement, the cloud can maintain a record of torque applied over time by the actuator S0 as well as a record of movement of the joint J3 over that time. In some situations, the cloud could determine that over some time period the actuator S0 applies torque but no corresponding movement is detected for joint J3. In this situation, the cloud may interpret that this determination corresponds to failure of the timing belt 228 (e.g., the timing belt 228 is damaged). Upon such determination, the cloud may send the maintenance request. Other examples are also possible.

In another case, the detection metric may correspond to detecting that wear of the particular component exceeds a threshold extent of wear. Once the cloud makes such detection, the cloud may send out a maintenance request for the particular component. By way of example, the cloud may receive data related to a measure of tension of the timing belt 228 over time. In this example, the cloud may have stored thereon a value representing a particular threshold tension that corresponds to a threshold extent of wear of the timing belt 228. As such, the cloud could determine that tension of the timing belt 228 is below the threshold tension and may responsively send a maintenance request for the timing belt 228.

In yet another case, the detection metric may correspond to detecting that the particular component has been operating, over a lifetime of the particular component, for a duration that exceeds or is about to exceed a threshold duration. To do so, the cloud may first obtain information related to implementation (and/or manufacturing) of the particular component. In particular, once the particular component is implemented in a particular robotic system, the cloud may receive input indicating the implementation and may responsively store a time corresponding to such implementation. Such input could take on various forms.

For example, sensors (e.g., proximity and/or touch sensors) could be positioned in the robotic system and could be used to detect presence and absence of the particular component. The cloud may thus receive data from such sensors to determine a time when the particular component is implemented. In another example, the input may be received via the computing device associated with the robotic system (e.g., by way of user-input). In this example, the input may provide for a time/date of implementation of the particular component and/or a time/date of manufacturing of the particular component, among other possibilities. Once received, the cloud may store the input in the database 110. Other examples are also possible.

After receiving this initial input, the cloud may be set to keep track of lifetime of the particular component. For instance, the cloud could determine the duration of time that the particular component has been present in the particular robotic system. In another instance, the cloud could determine the duration of time that the particular component has operated in the particular robotic system. By way of example, the cloud could determine the duration of time that the actuator S0 has applied torque over the lifetime of the actuator S0 thus far (e.g., rather than determining the duration of time that the actuator has been present in the robotic system). Other instances and examples are also possible.

With this arrangement, the cloud could determine whether the particular component has been operating (or present in the robotic system) for a duration that exceeds a threshold duration. This threshold duration could be stored at the database 110 based on input received by the cloud that indicates a lifetime of the component. By way of example, the cloud may receive user-input indicating that lifetime of the actuator S0 is 500,000 hours of operation. If the cloud determines that the particular component has operated for a duration that exceeds (e.g., 500,001 hours of operation of actuator S0) or is about to exceed (e.g., 499,999 hours of operation of actuator S0) the threshold duration, the cloud may responsively send the maintenance request.

In yet another case, the detection metric may correspond to detecting operation of the particular component at a particular operating value (or at a particular operating value that is within some set of values). In particular, this particular operating value may result in some extent of wear of the particular component or failure of the particular component, among others. Moreover, the cloud may store this particular operating value in database 110. As such, if the cloud determines that the particular component is operating or has operated at the particular operating value, the cloud may send out the maintenance request.

In one example, the cloud may have stored a particular torque that corresponds to potential wear (or failure) of the actuator S0. In this example, the cloud may determine that the actuator S0 has applied this particular torque and may then responsively send a maintenance request. In another example, wear of the timing belt 228 over time could impact various parameters in a robotic system. For instance, wear of the timing belt 228 may involve the timing belt 228 losing tension over time and/or teeth of the timing belt 228 wearing out over time (e.g., resulting in an increase of backlash). Such wear could impact settling time of a movable component 216 of the robotic system.

In particular, the settling time may refer to an extent of time needed for one or more robot links (e.g., appendages 220A-220D) to come to a stop, such as after the robotic system receives a command to stop movement of these robot links. In an example implementation, the cloud could receive a query related to such a command as well as motion data for the robot links (e.g., from motion sensors). The cloud may then use the time of the command and the motion data to determine the settling time. Alternatively, the robotic system may use such techniques to determine the settling time and may then report the settling time to the cloud. Other techniques are also possible.

As the timing belt 228 wears out over time, oscillation of the one or more robot links may increase as the robotic system attempts to stop movement of the links. This may therefore increase the settling time of the links. Hence, the cloud may have stored thereon one or more particular settling times (e.g., a range of settling times) that correspond to a threshold extent of wear of the timing belt 228. If the cloud determines that operation of a particular robotic system involves a settling time that matches one of the particular settling times (e.g., being within the range), the cloud may responsively send a maintenance request.

In a further aspect, a different component of the robotic system could be associated in some way with the particular component at issue. For instance, performance of the different component could impact performance of the particular component and vice versa. As a result, in some cases, the detection metric could correspond to detecting operation of the different component at a particular operating value and such detection may result in requesting maintenance for the particular component.

By way of example, controller 208 could control position of appendage 220A by sending particular commands to actuator S0. In this example, the actuator S0 may include a transmission having a particular stiffness. Changes to this stiffness over time could destabilize the controller 208 because, for example, the controller 208 may have certain stability margins and may thus send commands to the actuator S0 based on these stability margins. Various sensors could be used to monitor stiffness of the transmission over time and the cloud could receive and store information related to stiffness of the transmission.

In this example, the cloud may have stored thereon one or more particular values of stiffness that correspond to there being a need to adjust tuning of the controller 208. If the cloud determines that a value of stiffness of transmission in a particular robotic system matches one of the particular values of stiffness, the cloud may send out a maintenance request. This maintenance request may correspond to tuning of the controller 208 such that stability margins on the controller 208 are in line with the determined stiffness of the transmission. Other examples are also possible.

In yet another case, the detection metric may correspond to detecting a threshold change in performance of the particular component. Once the cloud detects this threshold change in performance, the cloud may send out a maintenance request for the particular component. In particular, the cloud may detect operation of the particular component at a first value. Subsequently, the cloud may detect a change in operation of the particular component from operating at the first value to operating at a second value. With this arrangement, the cloud could determine that the change exceeds a threshold change and may responsively send the maintenance request. This change may be in the form of a different (e.g., an absolute difference) between the first and second values. Alternatively, the change may be in the form of a percentage increase or decrease from the first value to the second value. Note, however, that the change could take on other forms as well.

By way of example, the cloud could receive data related to maximum output torque of the actuator S0 (e.g., the maximum torque that the actuator S0 is capable of applying). In this example, the cloud may have stored thereon at least one value that represents a threshold change in the maximum output torque of the actuator S0. This value may serve as an indication of some extent of wear or failure of the actuator S0. In this example, the cloud may detect that the actuator has a first maximum output torque. Subsequently (e.g., at a later point in time), the cloud may detect a change in the maximum output torque from (i) the actuator S0 being able to apply the first maximum output torque to (ii) the actuator S0 being able to apply a second maximum output torque. The cloud could determine that this change exceeds the threshold change (e.g., a threshold decrease in maximum output torque) and may responsively send the maintenance request.

In a further aspect, the detection metric may correspond to detecting a threshold change in performance of a different component that is associated with the particular component. Once the cloud detects this threshold change in performance, the cloud may send out a maintenance request for the particular component. In particular, the cloud may detect operation of the different component at a first value. Subsequently, the cloud may detect a change in operation of the different component from operating at the first value to operating at a second value. With this arrangement, the cloud could determine that the change exceeds a threshold change and may responsively send the maintenance request requesting maintenance for the particular component.

By way of example, the cloud could receive data related to settling time of the appendage 220A (e.g., based on the techniques discussed above). In this example, the cloud may have stored thereon at least one value that represents a threshold change in settling time of the appendage 220A. This value may serve as an indication of change in the stiffness of the transmission of actuator S0, thereby serving as an indication to tune controller 208 accordingly. In this example, the cloud may detect a first settling time for the appendage 220A. Subsequently, the cloud may detect a change in the settling time from (i) the appendage 220A having the first settling time to (ii) the appendage 220A having a second settling time. The cloud could determine that this change exceeds the threshold change and may responsively send a maintenance request requesting maintenance of the controller 208.

In yet another case, the detection metric may correspond to detecting one or more particular movements of the robotic system. In particular, the cloud may receive data representing movement of one or more movable components 216 such as of appendages 220A-220D for instance. The cloud may receive this data in one of various forms. For example, the cloud may receive information regarding coordinates of an appendage in physical space (e.g., based on data from position sensors). Once the appendage moves, the cloud may receive updated coordinates of the appendage in physical space. In this manner, the cloud may use the received information to determine movement of the appendage. Moreover, this information may represent a particular distance that the appendage has moved, a particular direction that the appendage has moved, and/or a particular angular distance that the appendage has moved relative to another appendage (e.g., rotation of a joint), among other possibilities.

In an example implementation, the cloud may have stored thereon information related to one or more particular movements of one or more movable component of the robotic system. Such particular movements may result in a particular extent of wear of the particular component or in failure of the particular component. If the cloud determines that the particular robotic system has carried out these particular movements, the cloud may send out a maintenance request for the particular component. Other cases are also possible.

As shown by block 506, method 500 involves determining a plurality of maintenance events for the particular component, where the plurality of maintenance events are associated with one or more of the plurality of robotic systems.

In an example arrangement, the cloud can maintain a record related to maintenance of the particular component at a particular robotic system. By way of example, the cloud may receive input (e.g., user-input at the computing device) that provides information related to the maintenance. This input may include a designation of the particular component for which maintenance was carried out, a time of the maintenance, and/or details of the maintenance (e.g., noting replacement of the particular component or particular adjustments to the particular component), among other possibilities. The cloud can also determine the maintenance time in other ways. For instance, the cloud can determine the maintenance time based on a time that the input is received and then store this time in the database 110 (e.g., in the event that the maintenance time is not provided via the input).

In another arrangement, the cloud can send a maintenance request in response to one of the detection metrics noted above. This maintenance request may take on various forms as further discuss in detail below. For instance, the maintenance request may include a time of the request, designation of the particular component, and/or details of the maintenance (e.g., suggesting replacement of the particular component or particular adjustments to the particular component), among other possibilities. In this arrangement, the cloud can store a record for a maintenance event following transmission of such a request. For example, the cloud may do so after receiving confirmation (e.g., provided via user-input on the computing device) in response to the request or may so without such confirmation. In an arrangement involving the confirmation, this confirmation may confirm receipt of the request and/or may confirm completion of the maintenance, among others.

In either case, the cloud can store a record of a maintenance event including some or all of the information included in the maintenance request. For example, the maintenance event could include the maintenance details that were included in the maintenance request. In another example, the cloud could designate the maintenance time as the time of the request. Alternatively, the cloud could designate the maintenance time as a time that the confirmation is sent (or received) or as a time denoted in the confirmation via input. Moreover, in the event of a confirmation, input may be received denoting changes to maintenance details suggested in the request. For example, the maintenance for the particular component may end up involving particular adjustments that are different from the suggested adjustments. Thus, input could be received as part of the confirmation (or separate from the confirmation) denoting the actual maintenance details involved in the maintenance event. Note, however, that maintenance of the particular component does not necessarily take place in response to a maintenance request and the cloud could record a maintenance event even without a corresponding maintenance request.

With such arrangements, the cloud can determine maintenance events for the various robotic systems in communication with the cloud and perhaps can store a maintenance time corresponding to each such maintenance event. Other arrangements are also possible.

As shown by block 508, method 500 then involves, based on the performance data, making a determination that at least one of the plurality of maintenance events occurs at one or more other metrics that are different from the at least one detection metric. And as shown by block 510, method 500 then involves, in response to making the determination, adjusting the at least one detection metric based on a difference between the at least one detection metric and the one or more other metrics.

Given the stored performance data as well as the stored maintenance events for the plurality of robotic systems, the cloud can be arranged to determine and/or analyze relationships between the performance data and the maintenance events. For instance, the cloud can use stored maintenance times as well as corresponding times of one or more metrics in the performance data to determine a relationship between the metrics and the maintenance events. By way of example, the cloud can determine that a maintenance event takes place at a corresponding maintenance time that is within a threshold duration of detecting one or more particular metrics for a corresponding robotic system operation (e.g., applying a particular torque using actuator S0). Based on this determination, the cloud may determine that operation at such particular metrics may cause (or at least partially contribute to) the maintenance event that took place within that threshold duration.

Once the cloud determines such relationships, the cloud can then determine that at least one maintenance event occurs at one or more metrics that are different from a stored detection metric. By way of example, the cloud may have stored thereon a detection metric corresponding to detecting that a particular torque is applied by actuator S0 (e.g., where such torque may correspond to wear of the actuator S0). Thus, the cloud may send out a maintenance request upon such detection. In this example, however, the cloud may determine at least one maintenance event corresponding to wear of the actuator S0 and may determine that such event takes place within threshold duration of the actuator S0 operating at a torque that is different than the particular torque. This different torque may be different from the particular torque by at least a threshold amount, among other possible differences.

Regardless, based on such a determination, the cloud may determine that the detection metric should be adjusted based on the difference between the one or more metrics and the stored detection metric. For example, the cloud may adjust the detection metric by adjusting the applied torque that would trigger a maintenance request. The particular adjustment may involve setting the applied torque that would trigger the maintenance request as an average of all the torques at issue. However, other example adjustments are also possible.

In some implementations, the cloud may carry out such adjustment in response to determining that at least a threshold number of maintenance events (rather than a single maintenance event) occur at one or more metrics that are different from a stored detection metric. In particular, the cloud may determine a number (e.g., 6) of maintenance events that occur at such different metrics. The metrics corresponding to such various events may be different relative to each other or may be the same. For example, metrics may include various torques that are all substantially different than the particular torque corresponding to the stored detection metric. In either case, the cloud may then determine that the number of maintenance events that occur as such metrics exceeds a threshold number (e.g., 6) and may responsively adjust the detection metric. However, if the number of such maintenance events does not exceed the threshold number, the cloud may not carry out an adjustment to the detection metric. Other implementations are also possible.

Various cases are discussed below to provide for examples of determined differences between the one or more metrics and the detection metrics. Additionally, the various cases also provide for example adjustments to the detection metric that can take place in response to such determined differences. While various cases are provided, the various cases should not be seen as limiting as other cases (as well as variations to the provided cases) are also possible.

In one case, as noted above, the detection metric may correspond to detecting a failure of the particular component. In particular, the cloud may detect a value (or a combination of values) in the performance data that corresponds to failure of the particular component. In this case, the cloud may determine that at least one maintenance event corresponds to failure of the particular component and that the at least one maintenance event occurs at one or more metrics that are different from the stored detection metric that would otherwise trigger a maintenance request.

By way of example, the cloud may determine at least one maintenance event corresponding to failure of the timing belt 228 in a particular robotic system. Also, the cloud may determine that the actuator S0 in the particular robotic system has operated at a particular speed prior to the failure. In this example, the cloud may determine that operation at such particular speed may have caused the failure. Subsequently, the cloud may also determine that no stored detection metric corresponds to detecting operation at this particular speed and responsively sending a maintenance request.

Thus, the cloud may generate a new detection metric that corresponds to detecting operation at this particular speed, thereby providing an additional trigger (e.g., in addition to other stored detection metrics) to send out a maintenance request. Alternatively, the cloud may adjust the stored detection metric such that a maintenance request is sent in response to operation at this particular speed rather than in response to detecting other metrics. Other examples are also possible.

In another case, as noted above, the detection metric may correspond to detecting that wear of the particular component exceeds a threshold extent of wear. In this case, the cloud may determine that at least one maintenance event occurs when the particular component experiences a particular extent of wear that is substantially different from the stored threshold extent of wear. In response to such a determination, the cloud may adjust the threshold extent of wear that would trigger a maintenance request, such as based on the particular extent of wear that was determined.

By way of example, as noted above, the cloud may receive data related to a measure of tension of the timing belt 228 over time. In this example, the cloud may have stored thereon a value representing a particular threshold tension that corresponds to a threshold extent of wear of the timing belt 228. As such, the cloud could determine that tension of the timing belt 228 is below the threshold tension and may responsively send a maintenance request for the timing belt 228. In this example, the cloud may determine that at least one maintenance event occurs when the timing belt 228 experiences a particular measure of tension that is above the threshold tension. Responsively, the cloud may adjust the threshold tension based on this particular measure of tension. For instance, the cloud may determine a weighted average of (i) stored measures of tensions that trigger maintenance requests and (ii) the particular measure of tension at issue. In this instance, the cloud may set the weighted average as the adjusted threshold tension. Other examples are also possible.

In yet another case, as noted above, the detection metric may correspond to detecting that the particular component has been operating, over a lifetime of the particular component, for a duration that exceeds or is about to exceed a threshold duration. In this case, the cloud may determine that at least one maintenance event occurs when the particular component has operated for a particular duration that is substantially different from the stored threshold duration. In response to such a determination, the cloud may adjust the threshold duration that would trigger a maintenance request, such as based on the particular duration that was determined.

By way of example, as noted above, the cloud may receive user-input indicating that lifetime of the actuator S0 is 500,000 hours of operation. If the cloud determines that the particular component has operated for a duration that exceeds (e.g., 500,001 hours of operation of actuator S0) or is about to exceed (e.g., 499,999 hours of operation of actuator S0) the threshold duration, the cloud may responsively send the maintenance request. In this example, the cloud may determine that at least one maintenance event corresponds to failure of actuator S0 in a particular robotic system after 700,000 hours of operation. In response to such a determination, the cloud may adjust the expected lifetime of the actuator S0 based on this maintenance event. For instance, the cloud may determine an average of the stored lifetime (e.g., 500,000 hours of operations) and of the lifetime associated with the maintenance event at issue (e.g., 700,000 hours of operation). The cloud may then set this average (e.g., 600,000 hours of operation) as the adjusted threshold duration that would then trigger a maintenance request. Other examples are also possible.

In yet another case, as noted above, the detection metric may correspond to detecting operation of the particular component at a particular operating value (or at a particular operating value that is within some set of values). In this case, the cloud may determine that at least one maintenance event is caused by operation of the particular component at one or more other operating values. Moreover, the cloud may determine that the other operating values are different from the particular operating value by at least a threshold amount (e.g., a statistical outlier). Responsively, the cloud may adjust the particular operating value that would trigger a maintenance request. For instance, the adjustment may involve determining a weighted average of the particular operating value and the one or more other operating values. The cloud may then set this weighted average as the adjusted particular operating value.

By way of example, as noted above, the cloud may have stored a particular torque that corresponds to potential wear (or failure) of the actuator S0. As a result, the cloud may determine when the actuator S0 in a particular robotic system applies this particular torque and may then responsively send a maintenance request. In this example, the cloud may determine that at least one maintenance event occurs after the actuator S0 applied another torque that is different from the stored particular torque. Responsively, the cloud may adjust the detection metric such that a maintenance request is additionally (or alternatively) sent in response to detecting application of the other torque. Alternatively, the cloud may determine a weighted average of the particular torque and the other torque and may then set the weighted average as the adjusted particular torque that would trigger the maintenance request. Other examples are also possible.

In a further aspect, as noted above, the detection metric could correspond to detecting operation of a different component (e.g., associated with the particular component) at a particular operating value and such detection may result in requesting maintenance for the particular component. In this aspect, the cloud may determine that at least one maintenance event is caused by operation of the different component at one or more other operating values. Moreover, the cloud may determine that the one or more other operating values are different from the particular operating values by at least a threshold amount. Responsively, the cloud may adjust the particular operating value that would trigger a maintenance request for the particular component, such as based on the one or more other operating values. Other aspects are also possible.

In yet another case, as noted above, the detection metric may correspond to detecting a threshold change in performance of the particular component. In particular, the cloud may detect operation of the particular component at a first value. Subsequently, the cloud may detect a change in operation of the particular component from operating at the first value to operating at a second value. With this arrangement, the cloud could determine that the change exceeds a threshold change and may responsively send the maintenance request.

In this case, the cloud may determine that at least one maintenance event is caused due to a different change in performance of the particular component, the different change being substantially different than the threshold change. Responsively, the cloud may adjust the threshold change that would trigger the maintenance request, such as based on the change in performance associated with the maintenance event at issue. For instance, the cloud may set the different change as the adjusted threshold change, among other possibilities.

By way of example, as noted above, the cloud could receive data related to maximum output torque of the actuator S0 (e.g., the maximum torque that the actuator S0 is capable of applying). Additionally, the cloud may have stored thereon at least one value that represents a threshold change in the maximum output torque of the actuator S0. This value may serve as an indication of some extent of wear or failure of the actuator S0. In this example, the cloud may detect that the actuator has a first maximum output torque. Subsequently (e.g., at a later point in time), the cloud may detect a change (e.g., decrease) in the maximum output torque from (i) the actuator S0 being able to apply the first maximum output torque to (ii) the actuator S0 being able to apply a second maximum output torque. The cloud could determine that this change exceeds the threshold change (e.g., a threshold decrease in maximum output torque) and may responsively send the maintenance request.

In this example, the cloud may determine that at least one maintenance event is caused by a change in the maximum output torque that does not exceed the stored threshold change. For instance, the cloud may detect a different change (e.g., decrease) in the maximum output torque from (i) the actuator S0 being able to apply the first maximum output torque to (ii) the actuator S0 being able to apply a third maximum output torque that is higher than the second maximum output torque. As a result, the cloud may adjust the threshold change based on the different change. For instance, the cloud may set the different change as the adjusted threshold change that would trigger a maintenance request. Other examples are also possible.

In a further aspect, as noted above, the detection metric may correspond to detecting a threshold change in performance of a different component that is associated with the particular component. In this aspect, the cloud may determine that at least one maintenance event is caused due to a different change in performance of the different component, the different change being substantially different than the threshold change. Responsively, the cloud may adjust the threshold change that would trigger the maintenance request for the particular component, such as based on the change in performance associated with the maintenance event at issue. For instance, the cloud may set the different change as the adjusted threshold change, among other possibilities. Other aspects are also possible.

In yet another case, as noted above, the detection metric may correspond to detecting one or more particular movements of the robotic system. In particular, the cloud may have stored thereon information related to one or more particular movements of one or more movable component of the robotic system. Such particular movements may result in a particular extent of wear of the particular component or in failure of the particular component. If the cloud determines that the particular robotic system has carried out these particular movements, the cloud may send out a maintenance request for the particular component.

In this case, the cloud may determine that at least one maintenance event is caused by one or more other robotic system movements. Responsively, the cloud may adjust the detection metric such that a maintenance request is sent in response to detecting the one or more other robotic system movements (rather than in response to detecting the one or more particular movements). Alternatively, the cloud may generate a new detection metric that corresponds to detection of the one or more other robotic system movements. In this manner, the cloud may send a maintenance request in response to detecting the one or more particular movements as well as in response to detecting the one or more other robotic system movements.

In some cases, the detection metric can be adjusted based on input received by the cloud, such based on user-input received via the computing device. Such input may specify particular adjustment to the detection metric and/or may specify one or more new detection metrics. For example, the input may specify that a maintenance request should be sent in response to detecting operation of the actuator S0 at a particular torque rather than sending the maintenance request in response to detecting operation of the actuator S0 at another torque. In another example, the input may specify that a maintenance request should be sent in response to detecting one or more robotic system movements that are not already stored on the database 110. Other examples and cases are also possible.

As shown by block 512, method 500 involves detecting subsequent operation of a particular robotic system from among the plurality of robotic systems, corresponding to the at least one adjusted detection metric and responsively requesting maintenance for the particular component at the particular robotic system.

Once a detection metric has been adjusted, the cloud may be set to use the performance data in order to determine when a particular robotic operates at the adjusted detection metric. If the cloud determines that the particular robotic system operates at the adjusted detection metric, the cloud may send out a maintenance request requesting maintenance for the particular component at the particular robotic system. This maintenance request may take on one of various forms.

In an example implementation, the cloud may send a message to a computing device that is associated with the particular robotic system for which maintenance is requested. This computing device may be a mobile device, a tablet, a laptop, or a computer that is coupled to the particular robotic system, among others. Moreover, the message may take the form of a short message service (SMS), an e-mail, or a notification displayed on a graphical user interface (GUI) of the computing device, among others.

In this implementation, the message may include information related to the maintenance request. For example, the message may indicate the particular component for which maintenance is request, may indicate a time of the maintenance request, and/or may include instructions related to performing maintenance for the particular component. In one case, such instructions may specify for replacement of the particular component. In another case, the instructions may specify one or more particular adjustments to the particular component. Additionally or alternatively, the instructions may specify one or more particular adjustments to a different component that is associated with the particular component.

In a further aspect, the message may include a snapshot of performance data of the particular component leading up to the maintenance request. This snapshot may be in the form of a graph or in the form of a data table, among other possibilities. In particular, this snapshot may represent operation of the robotic system leading up to the maintenance request. In this manner, a user can analyze the data leading up to the maintenance request and can determine whether any additional metrics may have contributed to wear or failure of the particular component. Note that such a snapshot can also be accessible via the computing device with or without the message.

In yet another aspect, the above techniques may also be used as a basis for adjustment of operating parameters of a robotic system. For instance, the system may detect that particular operating parameters correspond to maintenance events while detecting that other operating parameters do not correspond to maintenance events. With this arrangement, the system could cause adjustment to operation of a particular robotic system so that the particular robotic system generally operates at parameters that would not lead to a maintenance event (e.g., wear or failure). In this manner, operating efficiency and/or lifetime of the robotic system may be increased. By way of example, kinematic constraints could be adjusted such that the robotic system restricts movements to particular movements that would not lead to a maintenance event. In another example, controller gains could be adjusted based on vibrations in data received from encoders. Other examples may also be possible.

Further, as noted above, the system can provide for models representing the state of the robotic systems over time. These models could be used to develop the above-mentioned parameters as well as for consideration in future design and application development. By way of example, models could be generated for parameters such as friction characteristics and load/configuration dependent non-ideal considerations. These models could then be used to determine adjustment of parameters as well as for development of future robotic systems. For instance, evaluation of friction characteristics over time for the plurality of robotic system could aid in design of future robotic system, such as by designing a robotic system to have friction characteristics that do not correspond to a maintenance event. Other instances are also possible.

IV. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A method comprising:
receiving, by a computing system, sensor data from a plurality of robotic systems each having one or more sensors, wherein a particular timing belt is respectively installed within each robotic system of the plurality of robotic systems, wherein the computing system has stored thereon a detection metric that corresponds to detecting a first measure of tension during operation of the particular timing belt, and wherein the computing system is configured to request maintenance for the particular timing belt at a given robotic system, from among the plurality of robotic systems, in response detecting operation of the given robotic system at the stored detection metric;
based on the sensor data, determining, by the computing system, performance data representing performance of the particular timing belt over time at the plurality of robotic systems;
storing, by the computing system, a record of a plurality of maintenance events for the particular timing belt, wherein each maintenance event corresponds to maintenance performed on the particular timing belt at a given one of the plurality of robotic systems, and wherein the record indicates, respectively for each of the plurality of maintenance events, a maintenance time;
based on the performance data and on the stored record, making a determination, by the computing system, that at least one of the plurality of maintenance events occurs at a corresponding maintenance time that is within a threshold duration after a given time associated with another metric that is different from the stored detection metric;
in response to making the determination, determining, by the computing system, a new detection metric by (i) setting the other detection metric as the new detection metric or (ii) adjusting the stored detection metric based on the other metric, wherein the new detection metric corresponds to detecting a second measure of tension during operation of the particular timing belt; and
detecting, by the computing system, subsequent operation, of a particular robotic system from among the plurality of robotic systems, at the new detection metric and responsively sending, to a computing device, a message indicating a request for maintenance of the particular timing belt at the particular robotic system.

2. The method of claim 1, wherein making the determination comprises:
based on the stored record, determining that a particular maintenance event occurred at the corresponding maintenance time; and
based on the performance data, determining that, at the given time that is within the threshold duration prior to the corresponding maintenance time, the particular timing belt exhibited another measure of tension that is different from the first measure of tension.

3. The method of claim 2,
wherein the first measure of tension is indicative of failure of the particular timing belt, wherein making the determination further comprises, based on the stored record, determining that the particular maintenance event occurred due to failure of the particular timing belt, and wherein determining the new detection metric in response to making the determination comprises:
  in response to determining that, at the given time that is within the threshold duration prior to the corresponding maintenance time, the particular timing belt exhibited another measure of tension that is different from the first measure of tension, determining that the particular timing belt exhibiting the other measure of tension led to the failure due to which the particular maintenance event occurred; and
  in response to determining that the particular timing belt exhibiting the other measure of tension led to the failure due to which the particular maintenance event occurred, establishing the new detection metric such that the new detection metric corresponds to detecting the second measure of tension during operation of the particular timing belt, wherein the second measure of tension (i) is the other measure of tension or (ii) is based on the first and the other measures of tension.

4. The method of claim 2,
wherein the first measure of tension is indicative of wear of the particular timing belt exceeding a threshold extent of wear, wherein making the determination further comprises, based on the stored record, determining that the particular maintenance event occurred due to wear of the particular timing belt, and wherein determining the new detection metric in response to making the determination comprises:
  in response to determining that, at the given time that is within the threshold duration prior to the corresponding maintenance time, the particular timing belt exhibited another measure of tension that is different from the first measure of tension, determining that the particular timing belt exhibiting the other measure of tension led to the wear due to which the particular maintenance event occurred; and
  in response to determining that the particular timing belt exhibiting the other measure of tension led to the wear due to which the particular maintenance event occurred, adjusting the threshold extent of wear such that detecting the second measure of tension during operation of the particular timing belt is indicative of wear of the particular component exceeding the adjusted threshold extent of wear, wherein the second measure of tension (i) is the other measure of tension or (ii) is based on the first and the other measures of tension.

5. The method of claim 1, wherein sending the message to the computing device causes the computing device to display performance data indicative of performance of the particular timing belt at the particular robotic system during a time period leading up to the request for maintenance.

6. The method of claim 1, further comprising:
  engaging, by the computing system, in communication with the particular robotic system to cause the particular robotic system to operate at one or more operating values that prevent the particular timing belt from encountering the second measure of tension.

7. A method comprising:
  receiving, by a computing system, sensor data from a plurality of robotic systems each having one or more sensors, wherein a particular actuator is respectively installed within each robotic system of the plurality of robotic systems, wherein the computing system has stored thereon a detection metric that corresponds to detecting that the particular actuator is applying a first torque, and wherein the computing system is configured to request maintenance for the particular actuator at a given robotic system, from among the plurality of robotic systems, in response detecting operation of the given robotic system at the stored detection metric;
  based on the sensor data, determining, by the computing system, performance data representing performance of the particular actuator over time at the plurality of robotic systems;
  storing, by the computing system, a record of a plurality of maintenance events for the particular actuator, wherein each maintenance event corresponds to maintenance performed on the particular actuator at a given one of the plurality of robotic systems, and wherein the record indicates, respectively for each of the plurality of maintenance events, a maintenance time;
  based on the performance data and on the stored record, making a determination, by the computing system, that at least one of the plurality of maintenance events occurs at a corresponding maintenance time that is within a threshold duration after a given time associated with another metric that is different from the stored detection metric;
  in response to making the determination, determining, by the computing system, a new detection metric by (i) setting the other detection metric as the new detection metric or (ii) adjusting the stored detection metric based on the other metric, wherein the new detection metric corresponds to detecting that the particular actuator is applying a second torque; and
  detecting, by the computing system, subsequent operation, of a particular robotic system from among the plurality of robotic systems, at the new detection metric and responsively sending, to a computing device, a message indicating a request for maintenance of the particular actuator at the particular robotic system.

8. The method of claim 7, wherein making the determination comprises:
  based on the stored record, determining that a particular maintenance event occurred at the corresponding maintenance time; and
  based on the performance data, determining that, at the given time that is within the threshold duration prior to the corresponding maintenance time, the particular actuator applied another torque that is different from the first torque.

9. The method of claim 8,
wherein application of the first torque is indicative of failure of the particular actuator, wherein making the determination further comprises, based on the stored record, determining that the particular maintenance event occurred due to failure of the particular actuator, and wherein determining the new detection metric in response to making the determination comprises:
  in response to determining that, at the given time that is within the threshold duration prior to the corresponding maintenance time, the particular actuator applied another torque that is different from the first torque, determining that application of the other torque by the particular actuator led to the failure due to which the particular maintenance event occurred; and
  in response to determining that application of the other torque by the particular actuator led to the failure due to which the particular maintenance event occurred, establishing the new detection metric such that the new detection metric corresponds to detecting that the particular actuator is applying the second torque, wherein the second torque (i) is the other torque or (ii) is based on the first torque and the other torque.

10. The method of claim 8, wherein application of the first torque is indicative of wear of the particular actuator exceeding a threshold extent of wear, wherein making the determination further comprises, based on the stored record, determining that the particular maintenance event occurred due to wear of the particular actuator, and wherein determining the new detection metric in response to making the determination comprises:

in response to determining that, at the given time that is within the threshold duration prior to the corresponding maintenance time, the particular actuator applied another torque that is different from the first torque, determining that application of the other torque by the particular actuator led to the wear due to which the particular maintenance event occurred; and in response to determining that application of the other torque by the particular actuator led to the wear due to which the particular maintenance event occurred, adjusting the threshold extent of wear such that application of the second torque by the particular actuator is indicative of wear of the particular actuator exceeding the adjusted threshold extent of wear, wherein the second torque (i) is the other torque or (ii) is based on the first torque and the other torque.

11. The method of claim 7, further comprising:

engaging, by the computing system, in communication with the particular robotic system to cause the particular actuator to apply one or more torques other than the second torque.

12. The method of claim 7, wherein sending the message to the computing device causes the computing device to display performance data indicative of performance of the particular actuator at the particular robotic system during a time period leading up to the request for maintenance.

* * * * *